(12) United States Patent
Izmirliev et al.

(10) Patent No.: US 12,348,617 B2
(45) Date of Patent: Jul. 1, 2025

(54) SYSTEMS, METHODS, AND APPARATUSES FOR GENERATING DATA STRINGS AND FOR MANAGING ENCRYPTED DATA IN DATA CONTAINERS IN AN ELECTRONIC NETWORK

(71) Applicant: BANK OF AMERICA CORPORATION, Charlotte, NC (US)

(72) Inventors: Antoan Fotev Izmirliev, London (GB); Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 182 days.

(21) Appl. No.: 18/096,374

(22) Filed: Jan. 12, 2023

(65) Prior Publication Data
US 2024/0243906 A1    Jul. 18, 2024

(51) Int. Cl.
H04L 29/06 (2006.01)
G06F 21/60 (2013.01)
H04L 9/08 (2006.01)

(52) U.S. Cl.
CPC .......... *H04L 9/0838* (2013.01); *G06F 21/602* (2013.01)

(58) Field of Classification Search
CPC .............................. H04L 9/0838; G06F 21/602
See application file for complete search history.

(56) References Cited

U.S. PATENT DOCUMENTS

| 7,412,607 | B2 | 8/2008 | Magoshi |
| 7,607,024 | B2 | 10/2009 | Staring |
| 7,661,001 | B2 | 2/2010 | Higurashi |
| 8,635,461 | B2 | 1/2014 | Chang |
| 9,588,705 | B2 | 3/2017 | Carlson |
| 9,805,210 | B2 | 10/2017 | Nord |
| 10,013,364 | B1 | 7/2018 | O'Brien |
| 10,055,714 | B2 * | 8/2018 | Zhou ...................... G06Q 20/36 |
| 10,122,716 | B2 | 11/2018 | Shaw |
| 10,129,222 | B2 | 11/2018 | Maheshwari |
| 10,891,055 | B2 | 1/2021 | Warfield |

(Continued)

FOREIGN PATENT DOCUMENTS

| AU | 2018204309 B2 | 10/2020 |
| CN | 101141257 | 3/2008 |

(Continued)

*Primary Examiner* — Tri M Tran
(74) *Attorney, Agent, or Firm* — Moore & Van Allen PLLC; Lauren M. Stokes

(57) ABSTRACT

Systems, computer program products, and methods are described herein for generating data strings and for managing encrypted data in data containers in an electronic network. The present invention is configured to identify at least one data container, wherein the at least one data container comprises encrypted data; interrogate the at least one data container; determine at least one encryption associated with the encrypted data of the data container; receive at least one encryption key associated with the encrypted data; receive at least one tag associated with the encrypted data, wherein the at least one tag comprises at least one location identifier associated with the encrypted data; generate a string for the data of the data container, wherein the string comprises the at least one tag; and decrypt the encrypted data of the data container based on the at least one encryption key.

20 Claims, 7 Drawing Sheets

(56) References Cited

U.S. PATENT DOCUMENTS

| | | |
|---|---|---|
| 2003/0033308 A1* | 2/2003 | Patel .................. G06F 16/10 |
| 2005/0050342 A1 | 3/2005 | Boivie |
| 2008/0063197 A1 | 3/2008 | Jaquette |
| 2008/0063209 A1 | 3/2008 | Jaquette |
| 2008/0165973 A1 | 7/2008 | Miranda Gavillan |
| 2009/0097653 A1 | 4/2009 | Dahlerud |
| 2016/0196081 A1* | 7/2016 | Carlson ............... G06F 3/0686 |
| | | 713/193 |
| 2021/0184848 A1* | 6/2021 | Roowalla ............. H04L 63/123 |
| 2023/0169195 A1* | 6/2023 | Shah .................. G06F 21/6245 |
| | | 726/30 |

FOREIGN PATENT DOCUMENTS

| | | |
|---|---|---|
| CN | 101159541 A | 4/2008 |
| JP | 4867935 B2 | 2/2012 |

\* cited by examiner

SYSTEMS, METHODS, AND APPARATUSES FOR GENERATING DATA STRINGS AND FOR MANAGING ENCRYPTED DATA IN DATA CONTAINERS IN AN ELECTRONIC NETWORK

FIELD OF THE INVENTION

The present invention embraces a system for generating data strings and for managing encrypted data in data containers in an electronic network.

BACKGROUND

Managers of electronic networks comprising encrypted data have a harder them than ever managing and determining the locations historically associated with the encrypted data, the current location of the encrypted data, and determining when to allow decryption of the encrypted data in a safe, accurate, and efficient manner. For instance, such problems are exacerbated when the encrypted data has moved within the electronic network to different storage containers (or data containers) and other such databases. Such movement and different storage mechanisms may make it more difficult for the managers to additionally determine the encrypted data has not been tampered with, the encryption has remained intact, and while also being readily available for decryption at its current location. A need, therefore, exists for a system to accurately, efficiently, and securely manage encrypted data in an electronic network comprising different storage subsystems, such as different data containers.

Applicant has identified a number of deficiencies and problems associated with generating data strings and for managing encrypted data in data containers in an electronic network. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generating data strings and managing encrypted data is provided. In some embodiments, the system may comprise a memory device with computer-readable program code stored thereon; at least one processing device operatively coupled to the at least one memory device and the at least one communication device, wherein executing the computer-readable code is configured to cause the at least one processing device to: identify at least one data container, wherein the at least one data container comprises encrypted data; interrogate the at least one data container; determine at least one encryption associated with the encrypted data of the data container; receive at least one encryption key associated with the encrypted data; receive at least one tag associated with the encrypted data, wherein the at least one tag comprises at least one location identifier associated with the encrypted data; generate a string for the data of the data container, wherein the string comprises the at least one tag; and decrypt the encrypted data of the data container based on the at least one encryption key.

In some embodiments, the data container interrogates the data container.

In some embodiments, the interrogation of the data container comprises determining the encrypted data of the data container remains intact. In some embodiments, the at least one location identifier associated with the encrypted data comprises a plurality of locations associated with the encrypted data, and wherein each of the plurality of locations is associated with a location identifier. In some embodiments, the string comprises the plurality of locations associated with the encrypted data, and wherein the string comprises a current location identifier of the encrypted data. In some embodiments, the processing device is further configured to: receive at least one recipient encryption key from an intended recipient account of the encrypted data or a sender encryption key from a sender account of the encrypted data; identify, based on the encrypted data, at least one verified recipient encryption key or a verified sender encryption key; and compare the at least one recipient encryption key or the sender encryption key against the at least one verified recipient encryption key or the verified sender encryption key. In some embodiments, the processing device is further configured to: determine, based on the comparison of the at least one recipient encryption key or the sender encryption key against the at least one verified recipient encryption key or the verified sender encryption key, the at least one recipient encryption key or the sender encryption key matches the at least one verified recipient encryption key or the verified sender encryption key; determine, based on the at least one encryption key, the at least one encryption key matches a verified data container encryption key; and decrypt encrypted data based on the at least one recipient encryption key, the sender encryption key, or the at least one encryption key. In some embodiments, the processing device is further configured to: determine, based on the comparison of the at least one recipient encryption key or the sender encryption key against the at least one verified recipient encryption key or the verified sender encryption key, the at least one recipient encryption key or the sender encryption key does not match the at least one verified recipient encryption key or the verified sender encryption key; determine, based on the at least one encryption key, the at least one encryption key does not match a verified data container encryption key; and disallow decryption of encrypted data.

In some embodiments, the processing device is further configured to: receive sender agent data associated with the encrypted data, wherein the sender agent data comprises a sender agent identifier; receive potential recipient agent data associated with the encrypted data, wherein the potential recipient agent data comprises a potential recipient agent identifier; determine a security level of at least one of the sender agent identifier or the recipient agent identifier; download, based on the security level, at least one verified encryption key for the at least one sender agent identifier or the recipient agent identifier; and apply the at least one verified encryption key to the encrypted data.

In another aspect, a computer program product for generating data strings and managing encrypted data is provided. In some embodiments, the computer program product may comprise at least one non-transitory computer-readable medium having computer-readable program code portions embodied therein, the computer-readable program code portions which when executed by a processing device are configured to cause the processor to: identify at least one data container, wherein the at least one data container comprises encrypted data; interrogate the at least one data container; determine at least one encryption associated with the encrypted data of the data container; receive at least one encryption key associated with the encrypted data; receive at least one tag associated with the encrypted data, wherein the at least one tag comprises at least one location identifier associated with the encrypted data; generate a string for the data of the data container, wherein the string comprises the at least one tag; and decrypt the encrypted data of the data container based on the at least one encryption key.

In some embodiments, the data container interrogates the data container.

In some embodiments, the interrogation of the data container comprises determining the encrypted data of the data container remains intact.

In some embodiments, the at least one location identifier associated with the encrypted data comprises a plurality of locations associated with the encrypted data, and wherein each of the plurality of locations is associated with a location identifier. In some embodiments, the string comprises the plurality of locations associated with the encrypted data, and wherein the string comprises a current location identifier of the encrypted data. In some embodiments, the processing device is further configured to cause the processor to: receive at least one recipient encryption key from an intended recipient account of the encrypted data or a sender encryption key from a sender account of the encrypted data; identify, based on the encrypted data, at least one verified recipient encryption key or a verified sender encryption key; and compare the at least one recipient encryption key or the sender encryption key against the at least one verified recipient encryption key or the verified sender encryption key.

In another aspect, a computer-implemented method for generating data strings and managing encrypted data is provided. In some embodiments, the computer-implemented method comprises: identifying at least one data container, wherein the at least one data container comprises encrypted data; interrogating the at least one data container; determining at least one encryption associated with the encrypted data of the data container; receiving at least one encryption key associated with the encrypted data; receiving at least one tag associated with the encrypted data, wherein the at least one tag comprises at least one location identifier associated with the encrypted data; generating a string for the data of the data container, wherein the string comprises the at least one tag; and decrypting the encrypted data of the data container based on the at least one encryption key.

In some embodiments, the data container interrogates the data container.

In some embodiments, the interrogation of the data container comprises determining the encrypted data of the data container remains intact.

In some embodiments, the at least one location identifier associated with the encrypted data comprises a plurality of locations associated with the encrypted data, and wherein each of the plurality of locations is associated with a location identifier. In some embodiments, the string comprises the plurality of locations associated with the encrypted data, and wherein the string comprises a current location identifier of the encrypted data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
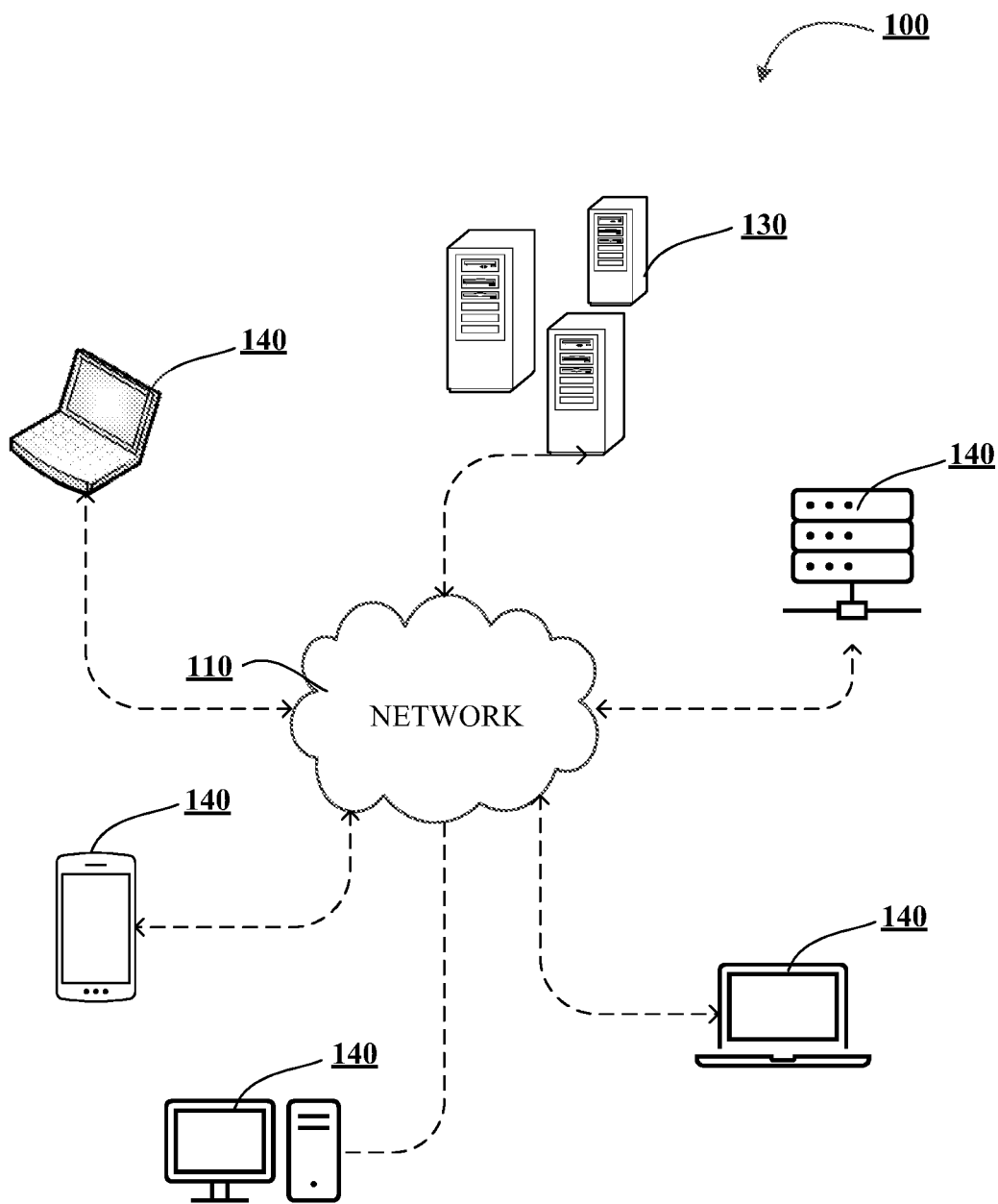
Figure 1B:
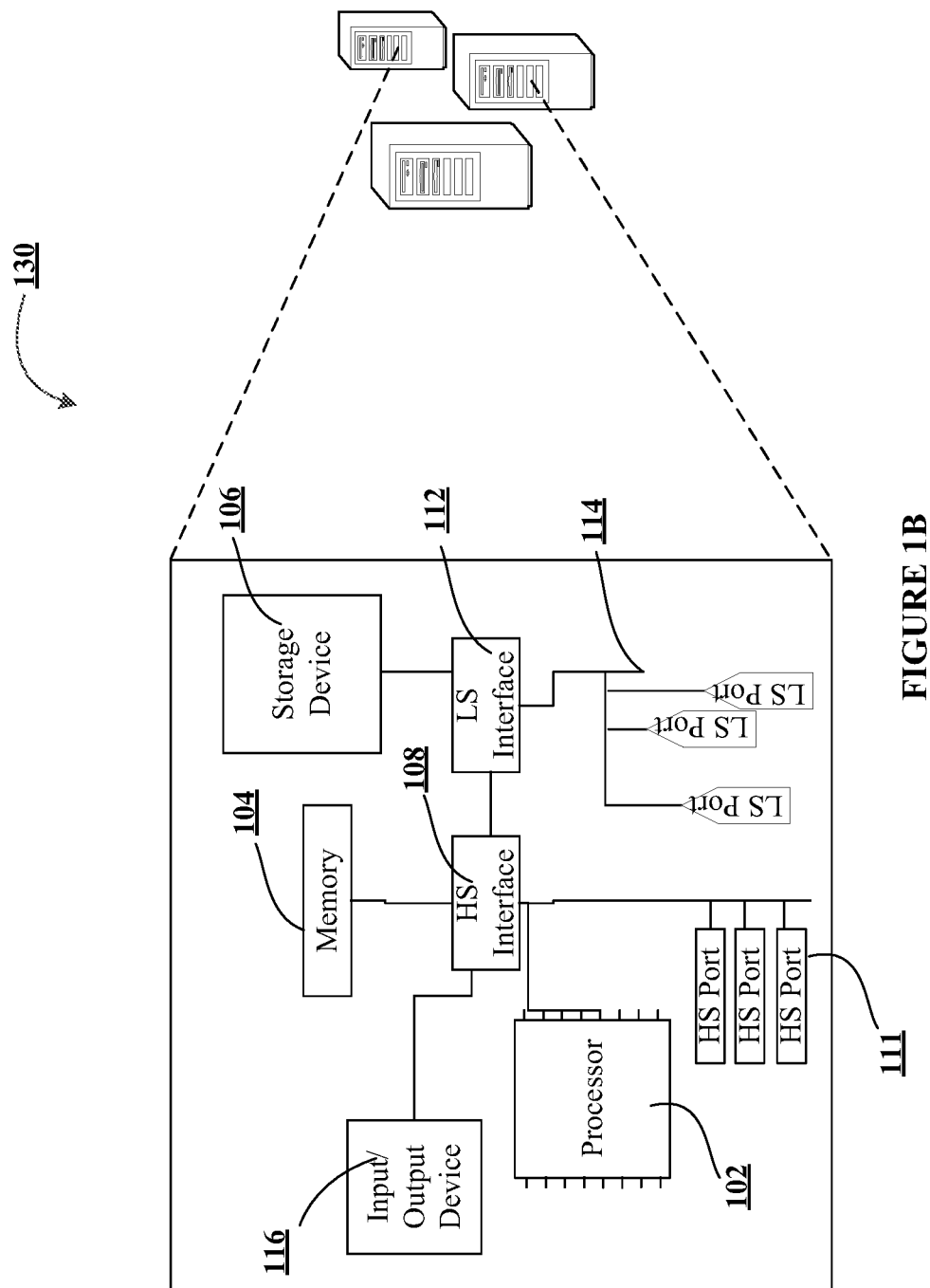
Figure 1C:
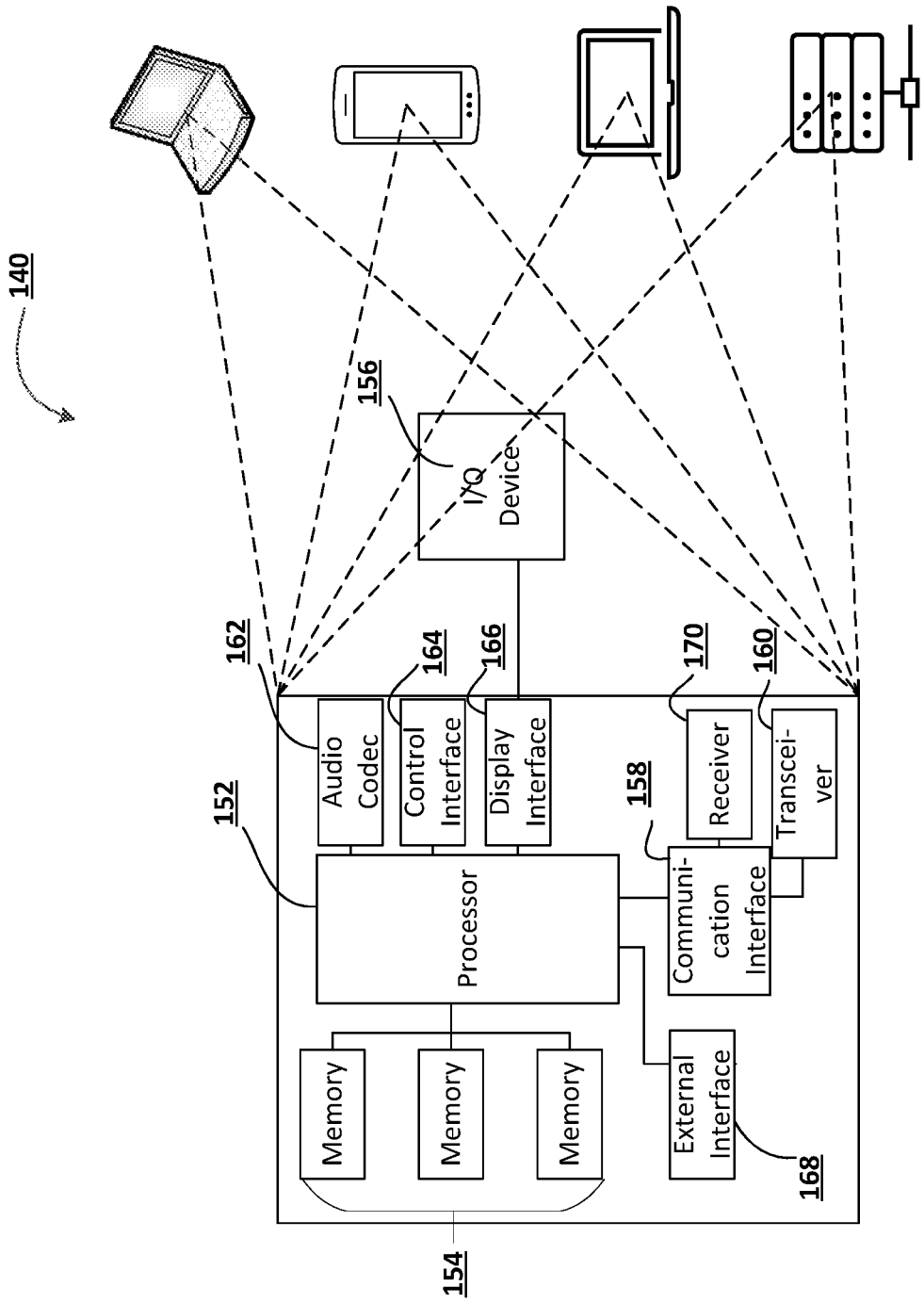
Figure 2:
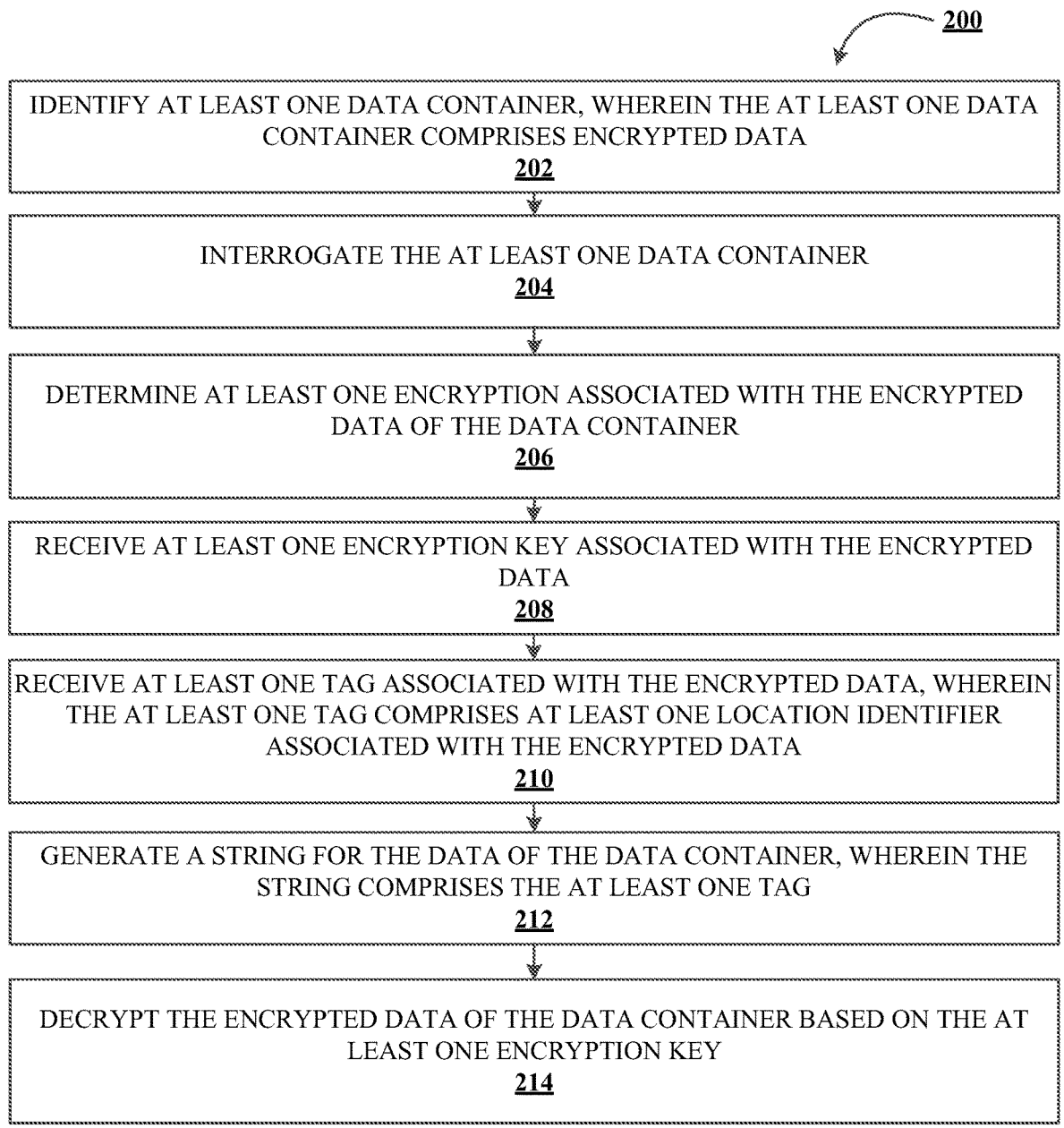
Figure 3:
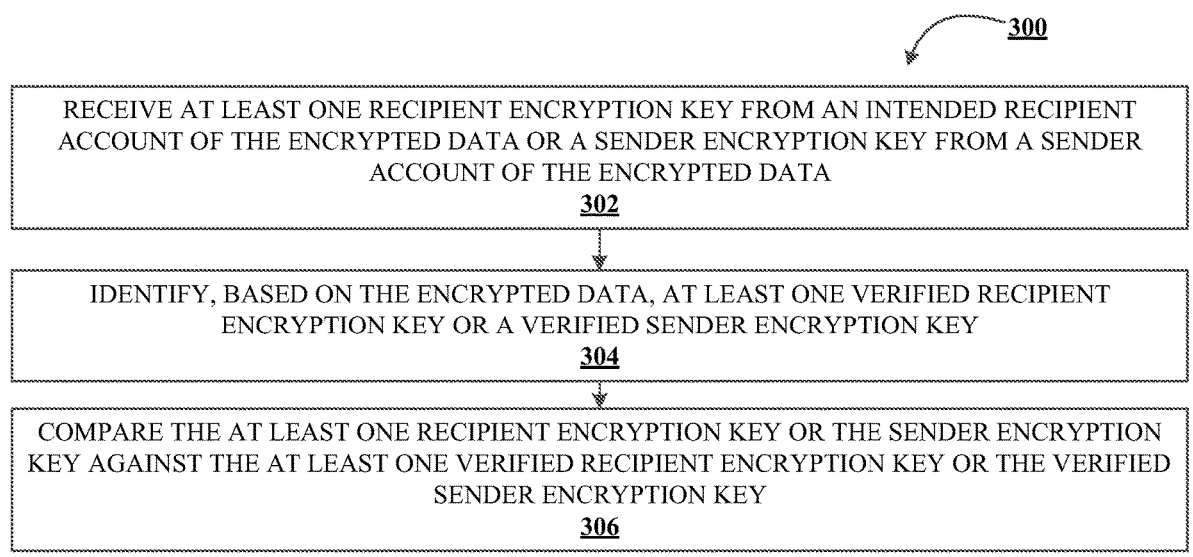
Figure 4:
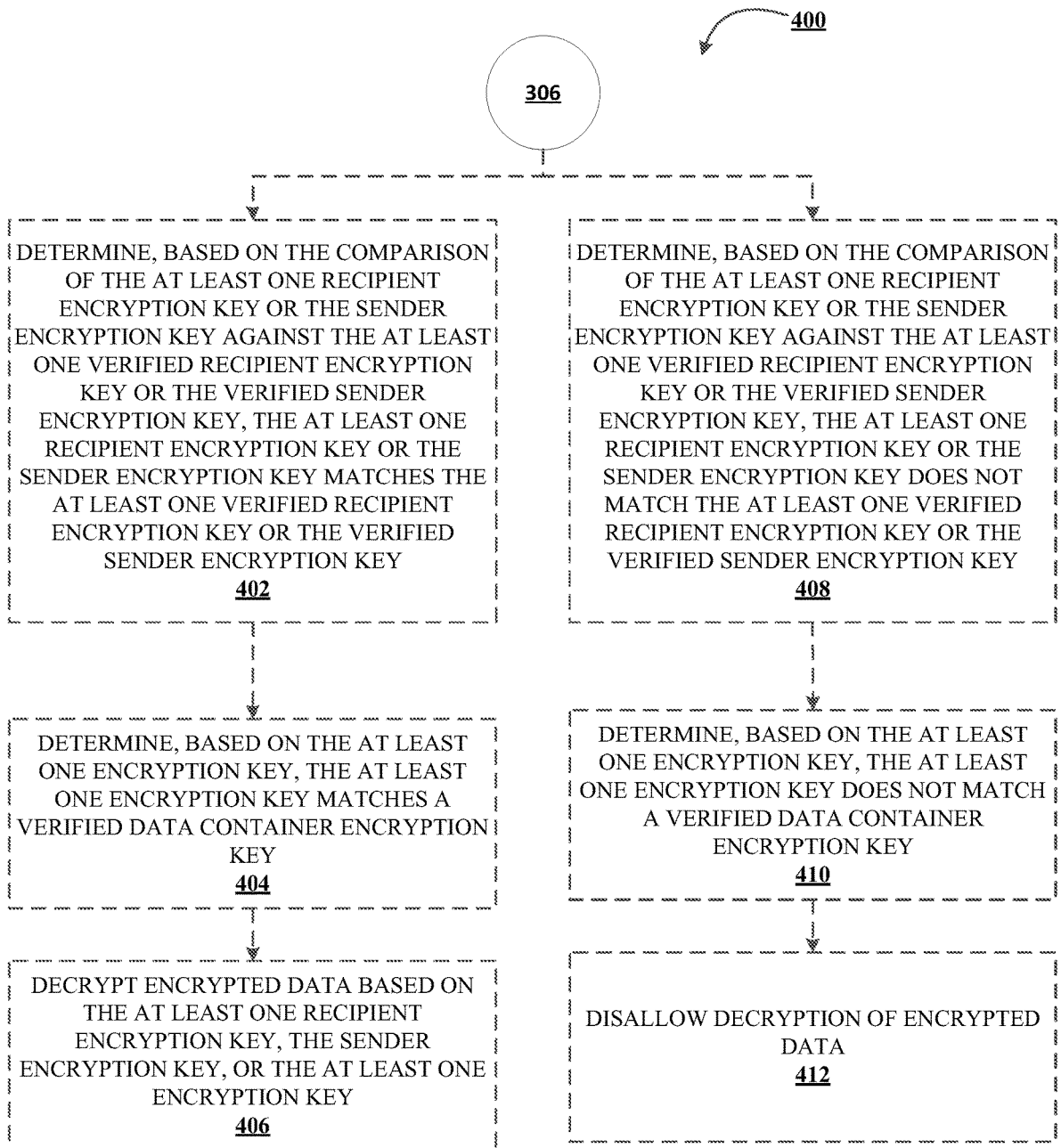
Figure 5:
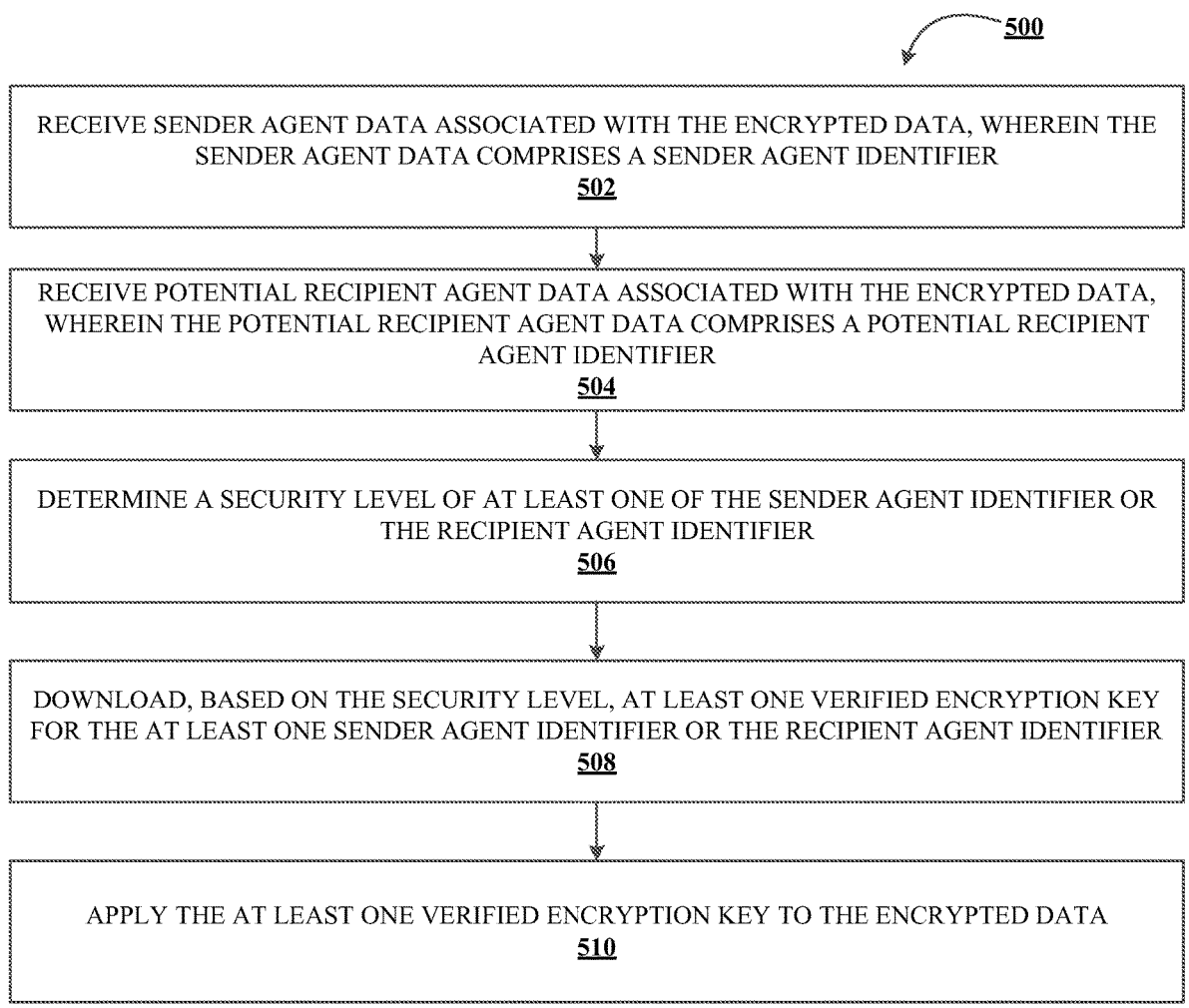

Having thus described embodiments of the invention in general terms, reference will now be made the accompanying drawings, wherein:

FIGS. 1A-1C illustrates technical components of an exemplary distributed computing environment for generating data strings and for managing encrypted data in data containers in an electronic network, in accordance with an embodiment of the invention;

FIG. 2 illustrates a process flow for generating data strings and for managing encrypted data in data containers in an electronic network, in accordance with an embodiment of the invention;

FIG. 3 illustrates a process flow for comparing the recipient encryption key or the sender encryption key against the at least one verified recipient encryption key or the verified sender encryption key, in accordance with an embodiment of the invention;

FIG. 4 illustrates a process flow for allowing or disallowing decryption of the encryption data, in accordance with an embodiment of the invention; and FIG. 5 illustrates a process flow for applying at least one verified encryption key to the encrypted data, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Managers of electronic networks comprising encrypted data stored in a plurality of locations (e.g., a plurality of data containers and other such storage subsystems) may have a harder time than ever managing the associated encrypted data across all the data containers. Further, managers of these electronic networks may also have difficulty tracking the locations (e.g., historical locations and current locations) of the encrypted data such that easy and efficient recall of the encrypted data for decryption may occur accurately and quickly. Additionally, such problems in determining when to allow decryption of the encrypted data may further be exacerbated when the encrypted data needs to be decrypted quickly, but there may be difficulty in determining whether the sender account or sender agent and/or the recipient account or recipient agent should have access to the decrypted data. A need, therefore, exists for a system to accurately, efficiently, and securely manage encrypted data in an electronic network comprising different storage subsystems, such as different data containers.

Thus, and as described in further detail herein, the present invention provides a solution to the above-referenced problems in the field of technology by generating a system (i.e., an encrypted data management system) to broadly (e.g., across a plurality of data containers), accurately, efficiently, and securely manage encrypted data in an electronic network. Such a system solves at least the technical problems in accurately determining historical and current locations of encrypted data for quick recall; efficiently determining historical and current locations, efficiently generating strings associated with the historical and current locations of each encrypted data, and efficiently verifying encryption keys for decryption of the encrypted data; and securely allowing decryption of encrypted data once the encryption key(s) have been verified. Such an encrypted data management system, thus, may solve the above-identified technical problems by at least identifying a data container associated with the encrypted data management system (e.g., a data container that the encrypted data management system is tasked with tracking), where the data container comprises encrypted data. The encrypted data management system may further interrogate the data container to determine at least one encryption associated with the encrypted data (e.g., a type of encryption and other such data regarding the encryption used to encrypt the data). The encrypted data management system may additionally receive an encryption key associated with the encrypted data, such as an encryption key associated with the data container storing the encrypted data, the potential recipient of the encrypted data, the sender of the encrypted data, and/or the like; and the encrypted data management system may also receive a tag associated with the encrypted data, where the tag may be based on a unique identifier of the current data container storing the encrypted data and/or a unique identifier of previous data containers that stored the encrypted data (i.e., historical locations). The encrypted data management system may additionally generate a string for the data of the data container which may comprise the tag of the current data container storing the encrypted data, and in some embodiments, the tags associated with the historical data containers. The encrypted data management system may additionally decrypt the encrypted data of the data container by applying the encryption key received, where such an encryption key may be associated with the current data container, the potential recipient of the encrypted data, the sender of the encrypted data, and/or the like.

Accordingly, the present invention works by identifying at least one data container, wherein the at least one data container comprises encrypted data; interrogating the at least one data container; determining at least one encryption associated with the encrypted data of the data container; receiving at least one encryption key associated with the encrypted data; receiving at least one tag associated with the encrypted data, wherein the at least one tag comprises at least one location identifier associated with the encrypted data; generating a string for the data of the data container, wherein the string comprises the at least one tag; and decrypting the encrypted data of the data container based on the at least one encryption key.

What is more, the present invention provides a technical solution to a technical problem. As described herein, the technical problem includes the broad, accurate, efficient, and secure management of encrypted data across data containers in an electronic network. The technical solution presented herein allows for an encrypted data management system that provides the broad, accurate, efficient, and secure management of the encrypted data. In particular, encrypted data management system is an improvement over existing solutions to the management of encrypted data, (i) with fewer steps to achieve the solution, thus reducing the amount of computing resources, such as processing resources, storage resources, network resources, and/or the like, that are being used (e.g., such as fewer steps in determining current and historical storage locations of the encrypted data; fewer steps in decrypting the encrypted data based on security levels; fewer steps in decrypting encrypted data based on different encryption keys for the sender agent, the recipient agent, the data container, and/or the like); (ii) providing a more accurate solution to problem, thus reducing the number of resources required to remedy any errors made due to a less accurate solution (e.g., providing more accurate and secure solutions in decrypting encrypted data by requesting more encryption keys before allowing decryption of the encrypted data, such as encryption keys from the sender account, the recipient account, and the data container currently storing the encrypted data); (iii) removing manual input and waste from the implementation of the solution, thus improving speed and efficiency of the process and conserving computing resources (e.g., removing manual input of encryption keys, manual input of location identifiers of current and historical data container locations, and/or the like); (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for generating data strings and for managing encrypted data in data containers in an electronic network 100, in accordance with an embodiment of the invention. As shown in FIG. 1A, the distributed computing environment 100 contemplated herein may include a system 130 (i.e., an encrypted data management system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for generating data strings and for managing encrypted data in data containers in an electronic network, in accordance with an embodiment of the invention. In some embodiments, a system (e.g., similar to one or more of the systems described herein with respect to FIGS. 1A-1C) may perform one or more of the steps of process flow 200. For example, an encrypted data management system (e.g., the system 130 described herein with respect to FIG. 1A-1C) may perform the steps of process 200.

As shown in block 202, the process flow 200 may include the step of identifying at least one data container, wherein the at least one data container comprises encrypted data. In some embodiments, the system may identify at least one data container that stores data and is associated with the encrypted data management system. For instance, the encrypted data management system may identifier at least one data container, or a plurality of data containers, comprising or storing data. By way of non-limiting example, the encrypted data management system may identify at least one data container from a plurality of data containers based on a list of data containers available to the encrypted data management system. For instance, the encrypted data management system may identify each data container from a database of data container identifiers associated with each data container. In some embodiments, at least one data container, or a plurality of data containers, may comprise or store encrypted data.

As shown in block 204, the process flow 200 may include the step of interrogating the at least one data container. In some embodiments, the encrypted data management system may interrogate the at least one data container and its associated data, including any encrypted data stored in the data container(s). Such an interrogation may comprise gathering insights and/or information regarding the data stored in the data containers, such as whether the data is encrypted, whether the data has been tampered with (e.g., remains intact), the quality of the data, where the data was collected from, and/or the like. In some embodiments, the encrypted data management system may interrogate the data containers themselves in order to determine information and insights regarding the data containers, where such insights and information may comprise information regarding the data container's security (e.g., ability to store encrypted data and/or ability for the data container to be encrypted), data storage capabilities for each data container, data container viability (e.g., quality of the data container and whether the data container has been tampered with), and/or the like.

In some embodiments, the encrypted data management system may be configured to allow each data container to interrogate itself. For instance, the data containers may be configured to interrogate and/or gather data on itself and/or other such data containers.

As shown in block 206, the process flow 200 may include the step of determining at least one encryption associated with the encrypted data of the data container. In some embodiments, the encrypted data management system may determine at least one encryption associated with the encrypted data of the at least one data container that has been interrogated. Such a determination of the encryption for the encrypted data may comprise a determination that the encrypted data remains intact (e.g., has not been tampered with), that the encryption remains intact, a specific encryption type of the data, a specific encryption of the data, and/or the like.

As shown in block 208, the process flow 200 may include the step of receiving at least one encryption key associated with the encrypted data. In some embodiments, the encrypted data management system may receive at least one encryption key from the associated at least one data container, where the at least one encryption key may be used on the encrypted data stored in the associated data container. In some embodiments, the encrypted data management system may access the encryption key(s) associated with the data container(s) (and the associated encrypted data) from a separate database different than the data container(s). Thus, and in some embodiments, the encryption key(s) may be stored separate from the data container(s) but may still be accessed by the data container(s), and thus by the encrypted data management system.

As shown in block 210, the process flow 200 may include the step of receiving at least one tag associated with the encrypted data, wherein the at least one tag comprises at least one location identifier associated with the encrypted data. In some embodiments, the encrypted data management system may receive at least one tag associated with the encrypted data by at least the associated data container(s). For instance, the data container(s) comprising the encrypted data may each store at least one or a plurality of tags, where each tag may identify all the locations associated with the encrypted data, such as all the historical locations of all the data containers that previously stored and/or currently store the encrypted data. In this manner, each data container may be associated with a location identifier, which in turn may be used in an associated tag for the data container.

As shown in block 212, the process flow 200 may include the step of generating a string for the data of the data container, wherein the string comprises the at least one tag. In some embodiments, the encrypted data management system may generate a string based on the tag(s) associated with the encrypted data of the data container(s). For instance, the encrypted data management system may generate the string by combining the tag(s) associated with the encrypted data of the data container together to form the string of location identifiers for each piece of data (encrypted and/or the like) for each data container. In some embodiments, the string of location identifiers may be formed such that the string of location identifiers are in sequential order from the beginning of the data being stored to the current location of the data storage, with the current location of the data storage being at the end of the string.

As referred to herein, the location identifier may comprise a unique string of alphameric characters, a bit stream, and/or the like, which may uniquely identify each storage (data container) associated with the encrypted data management system. Further still, each string of location identifiers (or tags) may uniquely identify all the historical locations of each piece of data associated with the encrypted data management system, such that each string comprises all the locations of previous storage for each data (encrypted and/or the like) up to the current storage location (data container) of the data.

FIG. 3 illustrates a process flow 300 for comparing the recipient encryption key or the sender encryption key against the at least one verified recipient encryption key or the verified sender encryption key, in accordance with an embodiment of the invention. In some embodiments, a system (e.g., similar to one or more of the systems described herein with respect to FIGS. 1A-1C) may perform one or more of the steps of process flow 300. For example, an encrypted data management system (e.g., the system 130 described herein with respect to FIG. 1A-1C) may perform the steps of process 300.

As shown in block 302, the process flow 300 may include the step of receiving at least one recipient encryption key from an intended recipient account of the encrypted data or a sender encryption key from a sender account of the encrypted data. In some embodiments, the encrypted data management system may receive at least one recipient encryption key from a recipient user account that would like to access the encrypted data of the data container, where the recipient user account may comprise at least one recipient encryption key and/or a plurality of recipient encryption keys. Upon determining at least one encrypted data that a recipient user account seeks to decrypt, the recipient user account may transmit a recipient encryption key to the encrypted data management system, which may in turn be compared with a verified recipient encryption key that has been pre-verified for the encrypted data.

In some embodiments, the system may additionally and/or alternatively receive a sender encryption key from a sender user account of the encrypted data. For instance, and where the sender user account transmits the data associated with the data container to a recipient user account, the encrypted data management system may receive a sender encryption key that is associated with the sender user account. Similarly, and in some embodiments, the encrypted data management system may additionally receive the recipient user account associated with the recipient user account that has the encrypted data transmitted.

As shown in block 304, the process flow 300 may include the step of identifying, based on the encrypted data, at least one verified recipient encryption key or a verified sender encryption key. In some embodiments, the encrypted data management system may identify, based on the encrypted data intended to be accessed, at least one of a verified recipient encryption key or a verified sender encryption key from a database associated with the encrypted data. By way of non-limiting example, the encrypted data management system may access the at least one of the verified sender encryption key and/or the verified recipient encryption key from a database and/or a data container that stores the verified encryption keys for the encrypted data of the data containers. As used herein, the verified sender encryption key may refer to the encryption key associated with the sender user of the encrypted data that has been verified as decrypting the encrypted data. Additionally, and as used herein, the verified recipient encryption key may refer to the encryption key associated with the recipient user of the encrypted data that has been verified as decrypting the encrypted data.

As shown in block 306, the process flow 300 may include the step of comparing the at least one recipient encryption key or the sender encryption key against the at least one verified recipient encryption key or the verified sender encryption key. By way of non-limiting example, the encrypted data management system may compare the at least one received recipient encryption key and/or the sender encryption key against the at least one verified recipient encryption key or the verified sender encryption key in order to determine whether there are any matches. For instance, the encrypted data management system may be configured to compare the at least one received recipient encryption key against the at least one verified recipient encryption key associated with the encrypted data in order to determine whether there is a match. Additionally, or alternatively, the encrypted data management system may be configured to compare the at least one received sender encryption key against the verified sender encryption key associated with the encrypted data to determine whether there is a match. Such an instance where there is a match or is not a match with respect to both the sender encryption key and the recipient encryption key are discussed in further detail below with respect to FIG. 4.

As used herein, the term comparison or to compare may refer to the determination of whether the at least one recipient encryption key and/or the at least one sender encryption key exactly matches the at least one verified sender encryption key or the verified recipient encryption key. Such a comparison would determine whether the unique key(s) of each of the sender account and/or the recipient account exactly matches the already verified recipient encryption key and/or the verified sender encryption key. Thus, and in some embodiments, the at least one recipient encryption key and the verified recipient encryption key may match. Further, and in some embodiments, the sender encryption key may exactly match the verified sender encryption key, which may all be determined based on this comparison described in block 306.

FIG. 4 illustrates a process flow 400 for allowing or disallowing decryption of the encryption data, in accordance with an embodiment of the invention. In some embodiments, a system (e.g., similar to one or more of the systems described herein with respect to FIGS. 1A-1C) may perform one or more of the steps of process flow 400. For example, an encrypted data management system (e.g., the system 130 described herein with respect to FIG. 1A-1C) may perform the steps of process 400.

In some embodiments, and as shown in block 402, the process 400 may include the step of determining, based on the comparison of the at least one recipient encryption key or the sender encryption key against the at least one verified recipient encryption key, the at least one recipient encryption key or the sender encryption key matches the at least one verified recipient encryption key or the verified sender encryption key. In some embodiments, block 402 may occur after block 306 of FIG. 3, where each of the processes described with respect to blocks 402, 404, and 406, may occur after block 306. In some embodiments, each of the blocks and their associated processes (e.g., blocks 402, 404, and 406) may occur as their own process outside of the processes described in FIG. 3.

In some embodiments, the encrypted data management system may determine, based on the comparison described in block 306, that the at least one recipient encryption key and/or the sender encryption key exactly matches the at least verified recipient encryption key or the verified sender encryption key, such that at least one of the sender encryption key and/or the recipient encryption key is determined to be correct for the encrypted data. In some embodiments, the encrypted data management system may require that both sender encryption key and the recipient encryption key both match the verified sender encryption key and the verified recipient encryption key, respectively.

In some embodiments, and as shown in block 404, the process flow 400 may include the step of determining, based on the at least one encryption key, the at least one encryption key matches a verified data container encryption key. In some embodiments, the encrypted data management system may further determine—based on an encryption key associated with the data container storing the encrypted data—whether the encryption key matches a verified data container encryption key. Thus, and in some embodiments, the encrypted data management system may access a separate storage container and/or database of verified encryption keys, such as a separate storage container and/or database comprising at least one verified data container encryption key that is associated with the data container storing the encrypted data. In this manner, the encrypted data management system may determine an extra layer of security before potentially decrypting the encrypted data of the data container. For instance, and where encrypted data management system has already determined at least one sender encryption key and/or recipient encryption key matches the verified sender encryption key and/or verified recipient encryption key, and where the encrypted data management system further determines (e.g., based on a comparison) of the encryption key associated with the data container currently storing the encrypted data and the verified data container encryption key, the encrypted data management system may decrypt the encrypted data.

In some embodiments, the encrypted data management system may require all of the keys described herein (i.e., the sender encryption key, the recipient encryption key, and the encryption key associated with the data container) be verified by the verified sender encryption key, the verified recipient encryption key, and the verified data container encryption key before the encrypted data will be decrypted.

In some embodiments, and as shown in block 406, the process flow 400 may include the step of decrypting encrypted data based on the at least one recipient encryption key, the sender encryption key or the at least one encryption key. In some embodiments, the encrypted data management system may decrypt, using the at least one recipient encryption key, the sender encryption key, and/or the encryption key associated with the data container to decrypt the encrypted data. In some embodiments, the encrypted data may be decrypted based on a combination of the recipient encryption key, the sender encryption key, and the encryption key associated with the data container, where each of the recipient encryption key, the sender encryption key, and the encryption key associated with the data container are considered private keys used for decrypting the encrypted data. In some embodiments, the encrypted data management system may decrypt the encrypted data using the recipient encryption key and the encryption key associated with the data container, where both the recipient encryption key and the encryption key associated with the data container are considered private keys used for decryption purposes.

In some embodiments, and as shown in block 408, the process flow 400 may include the step of determining, based on the comparison of the at least one recipient encryption key or the sender encryption key against the at least one verified recipient encryption key, the at least one recipient encryption key or the sender encryption key does not match the at least one verified recipient encryption key or the verified sender encryption key. In some embodiments, block 408 may occur after block 306 of FIG. 3, where each of the processes described with respect to blocks 408, 410, and 412, may occur after block 306. In some embodiments, each of the blocks and their associated processes (e.g., blocks 408, 410, and 412) may occur as their own process outside of the processes described in FIG. 3.

In some embodiments, the encrypted data management system may determine, based on the comparison of sender encryption key and/or the recipient encryption key against the verified sender encryption key or the verified recipient encryption key, that the recipient encryption key does not match the verified recipient encryption key and/or the sender encryption key does not match the verified sender encryption key. Thus, and by way of non-limiting example, the encrypted data management system will not recognize a match of the at least one recipient encryption key or the sender encryption key where the recipient encryption key only matches the verified sender encryption key and/or where the recipient encryption key only matches the verified sender encryption key. Thus, and in some embodiments, the encrypted data management system may only compare the same type of encryption keys (e.g., the sender encryption key to the verified sender encryption key or the recipient encryption key to the verified recipient encryption key).

In some embodiments, and as shown in block 410, the process flow 400 may include the step of determining, based on the at least one encryption key, the at least one encryption key does not match a verified data container encryption key. In some embodiments, the encrypted data management system may further determine whether at least one encryption key associated with the data container matches the verified data container encryption key. Thus, and in some embodiments, the encrypted data management system may determine the at least one encryption key associated with the data container does not match the verified data container encryption key, which may be required to decrypt the encrypted data of the data container.

In some embodiments, and as shown in block 412, the process flow 400 may include the step of disallowing decryption of encrypted data. In some embodiments, and similar to the process described above with respect to blocks 404 and 406, the encrypted data management system may require the matching of all the encryption keys (i.e., the sender encryption key to the verified sender encryption key, the recipient encryption key to the verified recipient encryption key, the encryption key of the data container to the verified data container encryption key) in order to decrypt the encrypted data. For instance, in this embodiment, where any of the encryption keys do not match the verified encryption key (e.g., the sender encryption key does not match the verified sender encryption key, the recipient encryption key does not match the verified recipient encryption key, and/or the encryption key of the data container does not match the verified data container encryption key), the encrypted data management system may be unable to decrypt the encrypted data.

In some embodiments, and where the encrypted data management system only requires the matching of the recipient encryption key to the verified encryption key and the matching of the encryption key to the verified data container encryption key, and where at least one of the recipient encryption key or the encryption key do not match the verified recipient encryption key or the verified data container encryption key, respectively, the encrypted data management system may not decrypt the encrypted data.

Thus, and in some embodiments, the encrypted data management system may disallow the decryption of the encrypted data where the encryption keys (e.g., all the encryption keys, or a specific subset of the encryption keys) do not match the verified encryption keys.

FIG. 5 illustrates a process flow 500 for applying at least one verified encryption key to the encrypted data, in accordance with an embodiment of the invention. In some embodiments, a system (e.g., similar to one or more of the systems described herein with respect to FIGS. 1A-1C) may perform one or more of the steps of process flow 500. For example, an encrypted data management system (e.g., the system 130 described herein with respect to FIG. 1A-1C) may perform the steps of process 500.

As shown in block 502, the process flow 500 may include the step of receiving sender agent data associated with the encryption data, wherein the sender agent data comprises a sender agent identifier. In some embodiments, the encrypted data management system may receive sender agent data associated with the encrypted data, such as from a sender account associated with the account that sought to transmit the encrypted data to a recipient account. In some embodiments, the sender agent data may be determined by the encrypted data management system tracking each of its associated data (encrypted and un-encrypted) and each of the transmissions requested of the associated data. Thus, and in some embodiments, the encrypted data management system may track each of the requests associated with each data container and their associated data, including the sender agent data and the intended recipient agent data.

In some embodiments, the sender agent data may comprise a sender agent identifier which may uniquely identify the sender account associated with the sender agent. In some embodiments, the sender agent identifier may further be used to determine the sender encryption key associated with the sender account.

As shown in block 504, the process flow 500 may include the step of receiving potential recipient agent data associated with the encrypted data, wherein the potential recipient agent data comprises a potential recipient agent identifier. In some embodiments, the encrypted data management system may receive potential recipient agent data associated with the encrypted data by tracking each intended transmission of the encrypted data (e.g., each of the transmission requests associated with the encrypted data) and the intended recipient of reach intended transmission. For instance, the intended transmission should identify a potential recipient that will receive the encrypted data and who will be able to decrypt the encrypted data (e.g., with the recipient encryption key along with at least one of the encryption key associated with the data container and/or the sender encryption key). In some embodiments, the potential recipient agent data may comprise a potential recipient agent identifier, where the potential recipient agent identifier may be used to uniquely identify the recipient account of the intended transmission.

As shown in block 506, the process flow 500 may include the step of determining a security level of at least one of the sender agent identifier or the recipient agent identifier. In some embodiments, the encrypted data management system may determine a security level of at least one of the sender agent identifier and/or the recipient agent identifier. In some embodiments, the security level may comprise a low security level, a mid-level security, and/or a high level security.

For instance, and in some embodiments, the low level security may indicate that the at least one of the sender agent and/or associated sender account and/or the recipient agent and/or associated recipient account does not have a middle or high level of security clearance to view encrypted data (e.g., the sender account or recipient account cannot access a lot of the encrypted data associated with the encrypted data management system). Rather, and in some embodiments, the sender account and/or the recipient account may only be able to decrypt encrypted data that is determined to be of low-importance (e.g., determined by a client of the encrypted data management system, the controlling entity of the data container associated with the encrypted data, the encrypted data management system itself, and/or the like); the encrypted data that is determined to not comprise important information (e.g., personally identifiable information, secure data, and/or the like); and/or the like.

By way of non-limiting example, and where the security level of at least one of the sender agent (e.g., sender account) and/or the recipient agent (e.g., recipient account) has a mid-level security, the encrypted data management system may allow access to decrypt the encrypted data for only mid-level encrypted data. In some embodiments, the mid-level encrypted data may comprise data that is determined to be of no importance and mid-importance (e.g., determined by a client of the encrypted data management system, the controlling entity of the data container associated with the encrypted data, the encrypted data management system itself, and/or the like); the encrypted data that is determined to not comprise important information (low level security information) and encrypted data that is determined to only comprise mid-importance information; and/or the like.

By way of non-limiting information, and where the security level of at least one of the sender agent (e.g., sender account) and/or the recipient agent (e.g., recipient account) has a high level security, the encrypted data management system may allow access to decrypt the encrypted data for all levels of importance. For instance, the encrypted data management system may allow access to all the encrypted data associated with the high level of importance and other such encrypted data associated with lower levels of importance (e.g., mid importance information and low importance information). In some embodiments, the high-level encrypted data may comprise data that is determined to be of great or high importance (e.g., determined by a client of the encrypted data management system, the controlling entity of the data container associated with the encrypted data, the encrypted data management system itself, and/or the like) along with encrypted data of lower importance (e.g., mid importance information and low importance information); the encrypted data that is determined to not comprise important information (low level security information), the encrypted data that is determined to comprise mid-importance information, and the encrypted data that is determined to comprise high-importance information (e.g., personally identifiable information, secure data, and/or the like); and/or the like.

As shown in block 508, the process flow 500 may include the step of downloading, based on the security level, at least one verified encryption key for the at least one sender agent identifier or the recipient agent identifier. In some embodiments, the encrypted data management system may download at least one verified encryption key for the at least one of the sender agent identifier and/or the recipient agent identifier, where the at least one verified encryption key that is downloaded may be based on the security level determined for the sender agent identifier and/or the recipient agent identifier.

By way of non-limiting example, the at least one verified encryption key may be downloaded by the encrypted data management system from a repository and/or database of verified encryption keys, where the encrypted data management system may determine the particular verified encryption key(s) to download based on at least one of (1) the encrypted data that is intended to be decrypted, (2) the security level of at least one of the sender agent identifier and/or the receipt agent identifier. Thus, and where the security level of at least one of the sender agent identifier and/or the recipient agent identifier matches the security level of the encrypted data (e.g., low level security, mid-level security, or high level security), the encrypted data management system may download the verified encryption key associated with the encrypted data to decrypt the encrypted data. In this manner, the encrypted data management system may efficiently and accurately determine the security level of at least one of the sender agent or the recipient agent of the encrypted data and decrypt the data in an efficient, accurate, and secure manner.

In some embodiments and based on the security level of only the recipient agent identifier, the encrypted data management system may download the verified encryption key and apply it to the encrypted data. For instance and where the recipient agent is associated with a security level (e.g., a low level security, a mid-level security, or a high level security), the encrypted data management system may download the verified encryption key that matches the encrypted data where the security level of the encrypted data matches the security level of the recipient agent. In this manner, the encrypted data management system may only determine the security level of the encrypted data and the security level of the recipient agent in order to efficiently allow or disallow decryption of the encrypted data.

As shown in block 510, the process flow 500 may include the step of applying the at least one verified encryption key to the encrypted data. In some embodiments, the encrypted data management system may apply the at least one verified encryption key to the encrypted data to decrypt the encrypted data. For instance, and where at least one of the security level of the recipient agent and/or the sender agent matches the security level of the encrypted data, the encrypted data management system may determine that at least one of the sender agent and/or recipient agent should be allowed access to the encrypted data based on their security clearance.

In some embodiments and where the security level of both the sender agent identifier and the recipient agent identifier do not match the security level of the encrypted data, the encrypted data management system may not download a verified encryption key associated with the encrypted data. Instead and in some embodiments, the encrypted data management system may transmit a request to both the sender agent and the recipient agent for a new or second sender agent identifier (e.g., ask for new credentials) and/or a new or second recipient agent identifier (e.g., ask for new credentials) to determine the security level of both the second sender agent identifier and the send recipient agent identifier to decrypt the encrypted data. In some embodiments, the encrypted data management system may automatically block any future access of the sender agent and/or recipient agent of the encrypted data. In some embodiments, the encrypted data management system may automatically block the future access of the sender agent and/or recipient agent of the encrypted data for a predetermined period (e.g., an hour, two hours, three hours, four hours, five hours, six hours, twelve hours, a day, a week, and/or the like).

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating data strings and managing encrypted data, the system comprising:
    a memory device with computer-readable program code stored thereon, wherein the computer-readable program code is non-transitory;
    at least one processing device operatively coupled to the memory device, wherein executing the computer-readable code is configured to cause the at least one processing device to:
    identify at least one data container, wherein the at least one data container comprises encrypted data;
    interrogate the at least one data container;
    determine at least one encryption associated with the encrypted data of the data container;
    receive at least one encryption key associated with the encrypted data;
    receive a plurality of tags associated with the encrypted data, wherein the plurality of tags comprises each historical location identifier of historical data containers that previously stored the encrypted data and a current location identifier of the encrypted data associated with the encrypted data;
    generate a string for the data of the data container, wherein the string comprises the plurality of tags in sequential order from a first historical location identifier to the current location identifier; and
    decrypt the encrypted data of the data container based on the at least one encryption key.

2. The system of claim 1, wherein the data container interrogates the data container.

3. The system of claim 1, wherein the interrogation of the data container by the data container comprises determining the encrypted data of the data container remains intact or the encrypted data has been tampered with, determining the quality of the encrypted data, and determining a data source of the encrypted data.

4. The system of claim 1, wherein the at least one location identifier associated with the encrypted data comprises a plurality of locations associated with the encrypted data, and wherein each of the plurality of locations is associated with a location identifier.

5. The system of claim 4, wherein the string comprises the plurality of locations associated with the encrypted data, and wherein the string comprises a current location identifier of the encrypted data.

6. The system of claim 4, wherein the processing device is further configured to:
    receive at least one recipient encryption key from an intended recipient account of the encrypted data or a sender encryption key from a sender account of the encrypted data;
    identify, based on the encrypted data, at least one verified recipient encryption key or a verified sender encryption key; and
    compare the at least one recipient encryption key or the sender encryption key against the at least one verified recipient encryption key or the verified sender encryption key.

7. The system of claim 6, wherein the processing device is further configured to:
    determine, based on the comparison of the at least one recipient encryption key or the sender encryption key against the at least one verified recipient encryption key or the verified sender encryption key, the at least one recipient encryption key or the sender encryption key matches the at least one verified recipient encryption key or the verified sender encryption key;
    determine, based on the at least one encryption key, the at least one encryption key matches a verified data container encryption key; and
    decrypt encrypted data based on the at least one of the recipient encryption key or the sender encryption key, and the at least one encryption key.

8. The system of claim 6, wherein the processing device is further configured to:
    determine, based on the comparison of the at least one recipient encryption key or the sender encryption key against the at least one verified recipient encryption key or the verified sender encryption key, the at least one recipient encryption key or the sender encryption key does not match the at least one verified recipient encryption key or the verified sender encryption key;
    determine, based on the at least one encryption key, the at least one encryption key does not match a verified data container encryption key; and
    disallow decryption of encrypted data.

9. The system of claim 1, wherein the processing device is further configured to:
    receive sender agent data associated with the encrypted data, wherein the sender agent data comprises a sender agent identifier;
    receive potential recipient agent data associated with the encrypted data, wherein the potential recipient agent data comprises a potential recipient agent identifier;
    determine a security level of at least one of the sender agent identifier or the recipient agent identifier;
    download, based on the security level, at least one verified encryption key for the at least one sender agent identifier or the recipient agent identifier; and
    apply the at least one verified encryption key to the encrypted data.

10. A computer program product for generating data strings and managing encrypted data, wherein the computer program product comprises at least one non-transitory computer-readable medium having computer-readable program code portions embodied therein, the computer-readable program code portions which when executed by a processing device are configured to cause the processor to:
    identify at least one data container, wherein the at least one data container comprises encrypted data;
    interrogate the at least one data container;
    determine at least one encryption associated with the encrypted data of the data container;
    receive at least one encryption key associated with the encrypted data;
    receive a plurality of tags associated with the encrypted data, wherein the plurality of tags comprises each historical location identifier of historical data containers that previously stored the encrypted data and a current location identifier of the encrypted data associated with the encrypted data;

generate a string for the data of the data container, wherein the string comprises the plurality of tags in sequential order from a first historical location identifier to the current location identifier; and decrypt the encrypted data of the data container based on the at least one encryption key.

11. The computer program product of claim 10, wherein the data container interrogates the data container.

12. The computer program product of claim 10, wherein the interrogation of the data container by the data container comprises determining the encrypted data of the data container remains intact or the encrypted data has been tampered with, determining the quality of the encrypted data, and determining a data source of the encrypted data.

13. The computer program product of claim 10, wherein the at least one location identifier associated with the encrypted data comprises a plurality of locations associated with the encrypted data, and wherein each of the plurality of locations is associated with a location identifier.

14. The computer program product of claim 13, wherein the string comprises the plurality of locations associated with the encrypted data, and wherein the string comprises a current location identifier of the encrypted data.

15. The computer program product of claim 13, wherein the computer-readable program code portions further configured to cause the processor to:

receive at least one recipient encryption key from an intended recipient account of the encrypted data or a sender encryption key from a sender account of the encrypted data;

identify, based on the encrypted data, at least one verified recipient encryption key or a verified sender encryption key; and compare the at least one recipient encryption key or the sender encryption key against the at least one verified recipient encryption key or the verified sender encryption key.

16. A computer-implemented method for generating data strings and managing encrypted data, the computer-implemented method comprising:

identifying at least one data container, wherein the at least one data container comprises encrypted data;

interrogating the at least one data container;

determining at least one encryption associated with the encrypted data of the data container;

receiving at least one encryption key associated with the encrypted data;

receiving a plurality of tags associated with the encrypted data, wherein the plurality of tags comprises each historical location identifier of historical data containers that previously stored the encrypted data and a current location identifier of the encrypted data associated with the encrypted data;

generating a string for the data of the data container, wherein the string comprises plurality of tags in sequential order from a first historical location identifier to the current location identifier; and decrypting the encrypted data of the data container based on the at least one encryption key.

17. The computer-implemented method of claim 16, wherein the data container interrogates the data container.

18. The computer-implemented method of claim 16, wherein the interrogation of the data container by the data container comprises determining the encrypted data of the data container remains intact or the encrypted data has been tampered with, determining the quality of the encrypted data, and determining a data source of the encrypted data.

19. The computer-implemented method of claim 16, wherein the at least one location identifier associated with the encrypted data comprises a plurality of locations associated with the encrypted data, and wherein each of the plurality of locations is associated with a location identifier.

20. The computer-implemented method of claim 19, wherein the string comprises the plurality of locations associated with the encrypted data, and wherein the string comprises a current location identifier of the encrypted data.

* * * * *